Nov. 23, 1948.   A. F. KIRSCHBAUM   2,454,655
EDUCATIONAL DEVICE
Filed Nov. 22, 1946

A. F. Kirschbaum
Inventor

Patented Nov. 23, 1948

2,454,655

UNITED STATES PATENT OFFICE 2,454,655

EDUCATIONAL DEVICE

Abe F. Kirschbaum, Greenbelt, Md., assignor to Henry M. Grubola, Washington, D. C., and Edward F. Grubola, Long Island City, N. Y.

Application November 22, 1946, Serial No. 711,772

2 Claims. (Cl. 35—9)

This invention relates to an educational device in the form of a container having sight openings and in which a block is held, the block adapted to be moved throughout the length of the container and finally brought to rest adjacent to the sight openings, so that indicia thereon, may be read through the sight openings.

An important object of the invention is to provide a block wherein the indicia arranged thereon embody mathematical problems and the answers to the mathematical problems, the problems and answers being visible through the openings.

Still another object of the invention is to arrange the openings adjacent to one end of the container, so that when the block comes to rest, it will fit within the corner of the container and be held against movement.

With the foregoing and other objects in view, which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
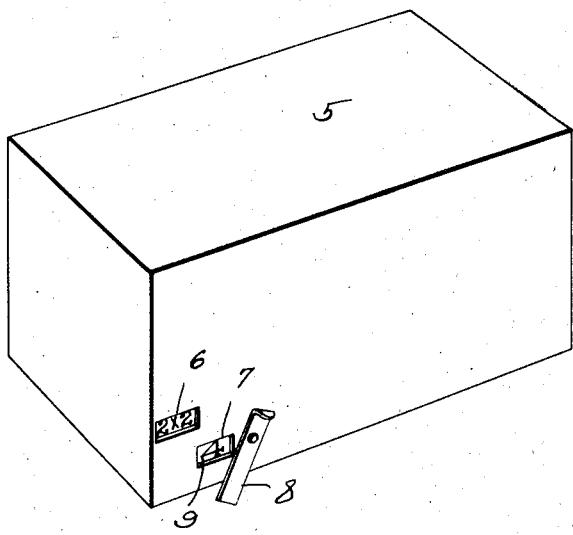
Figure 1 is a perspective view of a device constructed in accordance with the invention.
Figure 2:
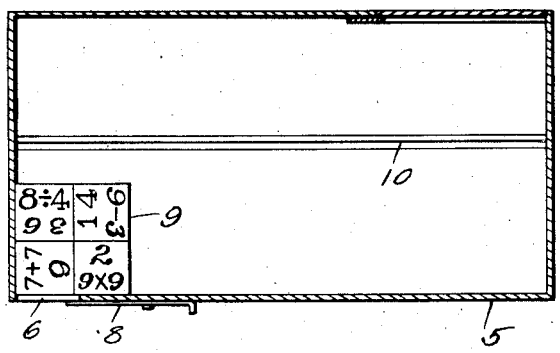
Figure 2 is a longitudinal sectional view through the device.
Figure 3:
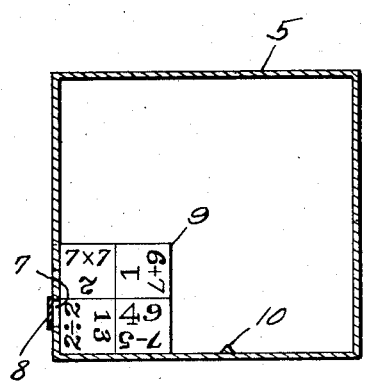
Figure 3 is a transverse sectional view through the device.

Referring to the drawing in detail, the reference character 5 indicates a rectangular container, which is provided with a sight opening 6 and a sight opening 7 arranged adjacent thereto, the sight opening 7 being normally closed by means of the pivoted closure 8. The indicia on the faces of the block 9 are arranged to indicate certain mathematical problems as well as the answers to the mathematical problems, the problems and answers being so arranged with respect to each other that when a certain problem appears before the sight opening 6, the answer to that particular problem will appear opposite to the sight opening 7 to be visible through the sight opening when the pivoted closure 8 moves to expose the answer.

In order that tumbling movement of the block will be insured, a rib 10 is provided within the body portion, the rib extending throughout the length of the body portion. It is obvious that as the block is moved within the body portion the block will contact the rib causing the block to tumble when rotated, to the end that the problems and answers appearing before the sight openings will be frequently changed lending to the attractiveness of the educational device.

It will also be noted that by the use of the device, children may be taught arithmetic while the device is being operated as a toy.

While I have shown and described the block as provided with indicia for calculating arithmetical problems, it is to be understood that the operation of the device will be equally as attractive if in place of the indicia, indicating characters of any desired nature, such as birds, animals, or the like, may be used on the block, together with words spelling the names of the animals, the names and pictures of the birds, fish or animals, being displayed simultaneously with the pictures to indicate the bird, fish or animal.

Having thus described the invention, what is claimed is:

1. An educational device comprising a rectangular hollow body portion having a pair of sight openings arranged adjacent to one end thereof, a rectangular block positioned within the body portion and adapted to move in a tumbling fashion within the body portion and come to rest in front of said sight openings, and said block having a combination of numbers depicting a mathematical problem thereon visible through one of the sight openings, and said block also having numbers visible through the adjacent opening representing the answer to the mathematical problem appearing in the first opening.

2. An educational device comprising a rectangular hollow body portion having a pair of sight openings arranged adjacent to one end thereof, a rectangular block having indicia formed on the surfaces thereof, the indicia being arranged to provide mathematical problems and the answers to the mathematical problems, said block adapted to move opposite to the sight openings, whereby the mathetmatical problem will appear through one of the sight openings, and the answer to that certain problem will appear before the opposite sight opening.

ABE F. KIRSCHBAUM.

REFERENCES CITED

The following references are of record in the file of this patent:

UNITED STATES PATENTS

| Number | Name | Date |
|---|---|---|
| 2,178,193 | Wade | Oct. 31, 1939 |

FOREIGN PATENTS

| Number | Country | Date |
|---|---|---|
| 634,076 | Germany | Aug. 15, 1936 |